(12) United States Patent
Dunstan et al.

(10) Patent No.: US 7,400,729 B2
(45) Date of Patent: Jul. 15, 2008

(54) SECURE DELIVERY OF ENCRYPTED DIGITAL CONTENT

(75) Inventors: Robert A. Dunstan, Forest Grove, OR (US); Ylian Saint-Hilaire, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1295 days.

(21) Appl. No.: 10/034,131

(22) Filed: Dec. 28, 2001

(65) Prior Publication Data

US 2003/0123665 A1 Jul. 3, 2003

(51) Int. Cl.
*H04N 7/167* (2006.01)

(52) U.S. Cl. .................. 380/239; 713/190; 380/201

(58) Field of Classification Search .............. 380/201, 380/239; 713/150, 190
See application file for complete search history.

(56) References Cited

U.S. PATENT DOCUMENTS

| | | | |
|---|---|---|---|
| 5,406,627 A * | 4/1995 | Thompson et al. ............ 380/237 |
| 5,708,963 A * | 1/1998 | Mobley et al. ............... 455/12.1 |
| 5,724,425 A * | 3/1998 | Chang et al. ................. 705/52 |
| 5,805,699 A * | 9/1998 | Akiyama et al. .............. 705/58 |
| 6,367,010 B1 * | 4/2002 | Venkatram et al. ........... 713/171 |
| 6,505,160 B1 * | 1/2003 | Levy et al. ................... 704/270 |
| 6,611,812 B2 * | 8/2003 | Hurtado et al. .............. 705/26 |
| 2002/0057799 A1 * | 5/2002 | Kohno ........................ 380/228 |
| 2002/0162104 A1 * | 10/2002 | Raike et al. .................. 725/31 |
| 2003/0021414 A1 * | 1/2003 | Nash-Putnam .............. 380/252 |

OTHER PUBLICATIONS

Digital Transmission Licensing Administrator Press Release, Jul. 17, 2001, "DTLA, Sony Pictures Entertainment Studio Licenses for Digital Home Network Technology".
Digital Transmission Licensing Administrator Homepage, www.dtcp.com, Sep. 5, 2001.
"Digital Transmission Content Protection," Bill Pearson, Intel Corporation, Jun. 16, 1999; presentation pp. 1-25.
"5C Digital Transmission Content Protection White Paper," Jul. 14, 1998, pp. 1-13.

* cited by examiner

Primary Examiner—Gilberto Barron, Jr.
Assistant Examiner—Samson B Lemma
(74) Attorney, Agent, or Firm—Fish & Richardson P.C.

(57) ABSTRACT

A content decoder is split into a decoder core and remaining portions. The decoder core implements decryption of encrypted content according to a selected encryption scheme, and the remaining portions provide an interface between the decoder core and content presentation systems/devices. Isolating the selected encryption scheme within the decoder core allows the content decoder to be produced and delivered to end users before the encryption scheme has been selected or developed. A logical separation of the content decoder from the decryption core allows the decryption core software to be updated and/or changed as needed.

30 Claims, 5 Drawing Sheets

SECURE DELIVERY OF ENCRYPTED DIGITAL CONTENT

BACKGROUND

The present application describes systems and techniques relating to secure delivery of encrypted digital content.

Conventional encryption/decryption technologies use various techniques to securely deliver encrypted digital content (e.g., music, movies, images, text) to a media player, such as a software application (e.g., RealPlayer, Windows Media Player) residing on a client computer system or a media player device (e.g., a digital versatile disk (DVD) player, a satellite signal decoder box). Generally, these techniques involve increasing the difficulty and/or computational expense of breaking the encryption scheme. Commonly used techniques include increasing an encryption scheme's complexity, using device authentication and authorization protocols, software obfuscation (i.e., making the decryption software difficult to reverse engineer), and reducing accessibility of encryption keys.

Common encryption schemes include asymmetric encryption and symmetric encryption. In symmetric encryption (AKA common key cryptology), the same key is used to encrypt and decrypt information. In asymmetric encryption (AKA public key cryptology), a public key is used to encrypt the information and a private key is used to decrypt the information (e.g., Pretty Good Privacy (PGP)).

Device authentication protocols typically involve an exchange of digital certificates. A digital certificate is an electronic attachment to a message commonly used to identify the message sender. Digital certificates are typically implemented using a public-key-based digital signature algorithm.

Device authorization protocols typically involve a central authority maintaining and transmitting access information defining which devices are authorized to access encrypted content.

A common software obfuscation technique is referred to as "spaghetti coding" in which the software is purposefully written to include an excessive number of jumps or branches, irrelevant code, self-modifying code, and the like. Other software obfuscation techniques include merging application data and instructions into the same address space, and setting debugger traps that discourage setting of breakpoints by a debugger program.

A "trusted" media player is one that, to a reasonable degree of certainty, will present content only to an authorized customer and will prevent the content from being obtained and saved in an unencrypted form. A media player includes software, or a combination of software and hardware, that implements a decryption and authorization scheme. Trusted media players typically use software obfuscation to discourage users from tampering with the media player to gain unauthorized access to encrypted digital content.

Moreover, some encryption schemes may depend on restricting access to the decryption software and hardware in a media player to discourage reverse engineering. For example, in real-time data exchange situations (e.g., streaming digital content on the Internet), typical encryption techniques include key handshakes, dynamic key exchange, and random key challenges. The security of these techniques typically depends on the decryption software and hardware being made available only to manufactures of media player devices.

DRAWING DESCRIPTIONS

Figure 1:
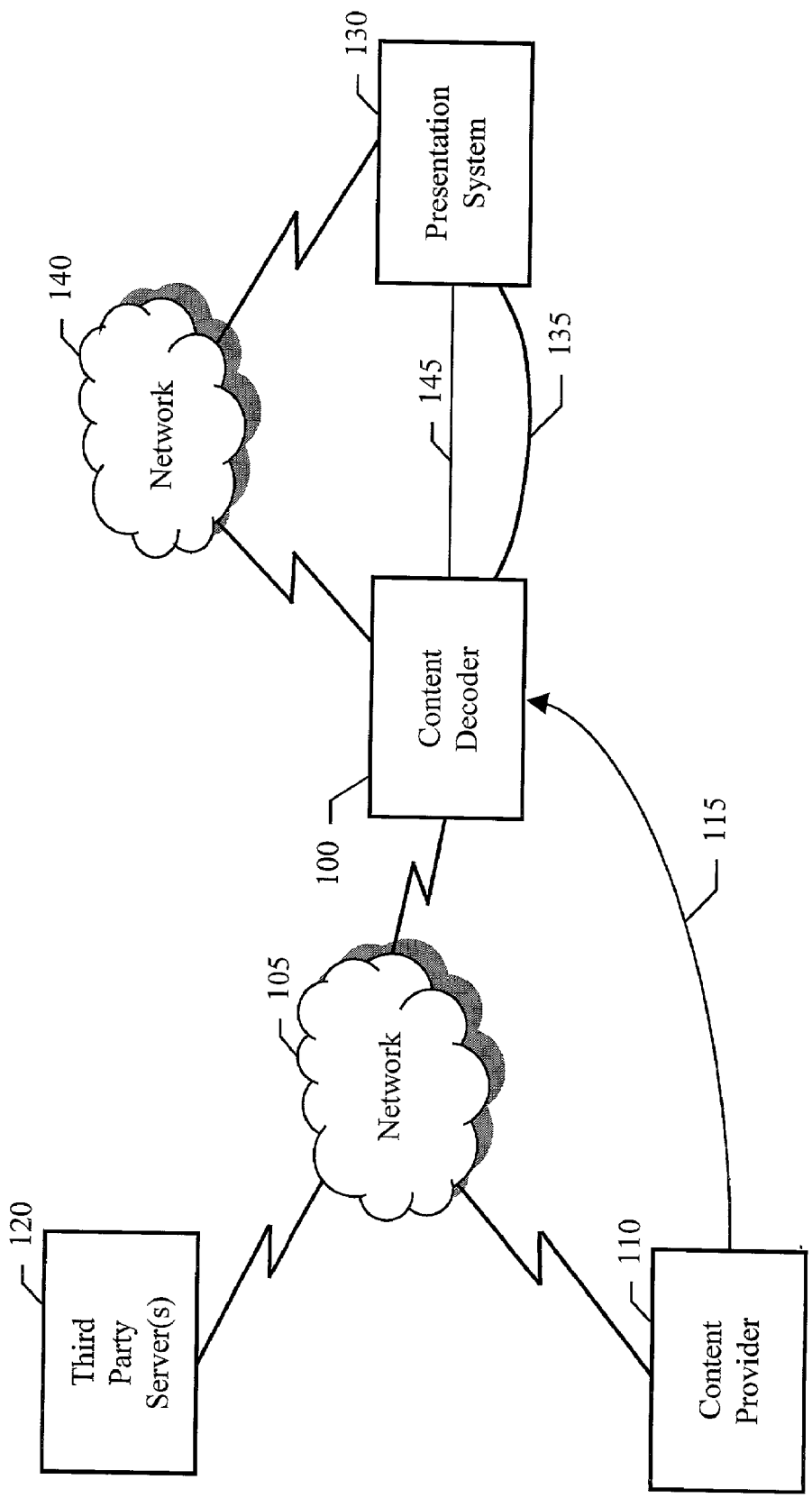
FIG. 1 is a block diagram illustrating an environment for securely delivering encrypted digital content.

Details of one or more embodiments are set forth in the accompanying drawings and the description below. Other features and advantages may be apparent from the description and drawings, and from the claims.

DETAILED DESCRIPTION

The systems and techniques described here relate to securely delivering encrypted digital content. As used herein, the term "digital content" includes any digital media or other data that may be encrypted. This may include music, movies, written works, images, software, and combinations of these.

The terms "digital media" and "media player" use the word "media" in the sense of digital content and the organizational/presentation tools of mass communication (e.g., newspapers, magazines, radio, television, etc.). In contrast, the term "machine-readable medium", which is defined further below, uses the word "medium" in the sense of the intervening substance through which machine instructions or digital content generally is transmitted or carried.

The present inventors recognized that conventional encryption standards for delivering encrypted digital content may fail to include a modification capability by which the content protection techniques used may be upgraded or changed over time. Once such an encryption standard has been broken (i.e., reverse engineered), all the content using that encryption standard is susceptible to illegal copying, thereby potentially providing a very high payoff for a reverse engineering effort.

Accordingly, the inventors recognized the potential advantages of providing mutable or upgradeable techniques to secure encrypted digital content and associated decryption schemes. A content decoder (e.g., a media player device such as a Tivo or a Replay device, media player software, or a component of these) can be logically divided into a replaceable decoder core and remaining portions. The decoder core implements a selected decryption scheme for decrypting encrypted content, and the remaining portions provide an interface between the decoder core and content presentation systems/devices. The decoder core may be changed as desired to implement a newly selected decryption scheme and/or to change the nature of the decoder core (e.g., a new software obfuscation, a new time-stamp).

By isolating the selected decryption scheme within the decoder core, the content decoder may be made independent of the encryption/decryption scheme to be used. Thus, the content decoder may be produced and delivered to end users before the encryption/decryption scheme has even been selected or developed.

This enables new content protection techniques to be created, and also enables modification of content protection techniques to be used with an already publicly distributed content decoder. The decoder core may be transmitted along with the content itself. The decoder core may be obfuscated to various levels, and this obfuscation may be changed over time and/or be specific to the content to be sent, as described further below.

Moreover, multiple encryption/decryption schemes may be used for successive deliveries of digital content. Multiple items of content may be encrypted each using a different encryption scheme, and yet all may be decrypted and presented using the same content decoder, albeit with a different decoder core for each different encryption scheme being used. Thus, if a decryption algorithm is broken, much less content may be compromised, thereby reducing the benefit of reverse engineering the content protection software.

This approach to content protection may be especially beneficial when the encrypted content is delivered to be stored locally, such as on a local hard drive or other machine-readable medium (e.g., an optical disc), or when the encrypted content is streaming content with no back-channel, such as in broadcast satellite delivery of digital content (e.g., movies delivered to the home by satellite). Because the decryptor (i.e., the decoder core) may be delivered with the encrypted content, access to the decryptor may be prevented up to the time of content delivery, and those who receive the encrypted content may have no indication of what the decryptor looks like until they receive the encrypted content. Thus, a reverse engineering attempt cannot begin until the content is already being delivered to authorized customers, thereby significantly reducing the chances that illegal copies can be made as soon as a piece of content is released.

FIG. 1 is a block diagram illustrating an environment for securely delivering encrypted digital content. A content decoder 100 receives encrypted digital content from a content provider 110, either over a network 105 or by another delivery channel 115. The network 105 may be a packet switched network, and the encrypted digital content may be delivered over the network 105 by broadcast or unicast.

The network 105 may be a broadcast network, a unicast network or both, and also may be a local area network (LAN), a metropolitan area network (MAN), or a wide area network (WAN). The network 105 also may be a private network, an enterprise network, a cable network, a unidirectional network (e.g., a satellite network) or other electromagnetic broadcast and/or unicast system, the Internet, a virtual private network, or any set of links that facilitate machine communications or enable encrypted content to be delivered to delivered to a receiving device.

The content provider 110 may be an owner of digital content (e.g., a movie studio, a music producer, an artist or author, a software developer), a licensee of such owner, a third party contractor of such owner, or a machine operated by any of these (e.g., a server on a network such as an Internet Protocol (IP) network, a broadcast satellite, etc.). The delivery channel 115 is another channel separate from the network 105. The delivery channel 115 may include other machine networks as well as physical delivery channels, such as trucks and retail stores.

The content decoder 100 allows decryption of the digital content for use on a presentation system 130, which may be implemented as software on a general-purpose computer, on embedded systems/devices, and/or one or more special purpose hardware components. The digital content may be provided to the presentation system 130 via a communication bus 135, a network 140 or a communication line 145. The digital content may also be re-encrypted before being provided to the presentation system 130. In this way, a trusted media player system may be built where a user cannot intercept and record unencrypted digital content.

The presentation system 130 may include a display screen such as a liquid crystal display (LCD) or cathode-ray tube (CRT), a speaker system, an output device generally, a machine for processing the digital content, or a combination of these. Additionally, the content decoder 100 may be contained within the presentation system 130. For example, the content decoder 100 and the presentation system 130 together may be a television (TV), a personal computer (PC), a personal digital assistant (PDA), a tablet, or other consumer electronic (CE) device.

Moreover, the content decoder 100 may be contained in an adapter that converts the encrypted digital content into an analog signal suitable for input into the presentation system 130. Such analog signals may themselves be modified (e.g. MacroVision®) to make it difficult to record to an analog recorder (e.g., a videocassette recorder (VCR)).

The content decoder 100 may be software running on a computer, microprocessor or other machine, or the content decoder 100 may be software and/or hardware in a media-receiving device such as a set-top box. The network 140 may be a wired LAN such as an Ethernet or a wireless LAN such as an IEEE (Institute of Electrical and Electronics Engineers) 802.11 LAN. The presentation system 130 may be a TV, a PC, a PDA, a tablet, a CE device generally, or another display device or system. The presentation system 130 may also include recording functionality (e.g., it may be a personal video recorder (PVR), or include a videocassette recorder (VCR), a digital video recorder (DVR), etc.) and may allow content recording under various policies (e.g., a "copy many" or "copy once" policy).

In addition, one or more third party servers 120 may be in communication with the content decoder 100 and/or with the content provider 110, through the network 105 or through separate machine communication channels. The third party server(s) 120 may provide various services to the content decoder 100 and/or the content provider 110. For example, a third party time server may provide signed time checks to the content decoder 100 for use with time-stamped digital content. A third party decryption scheme server may provide new keys and obfuscated software to the content provider 110. These and other implementation variations are discussed below.

Figure 2:
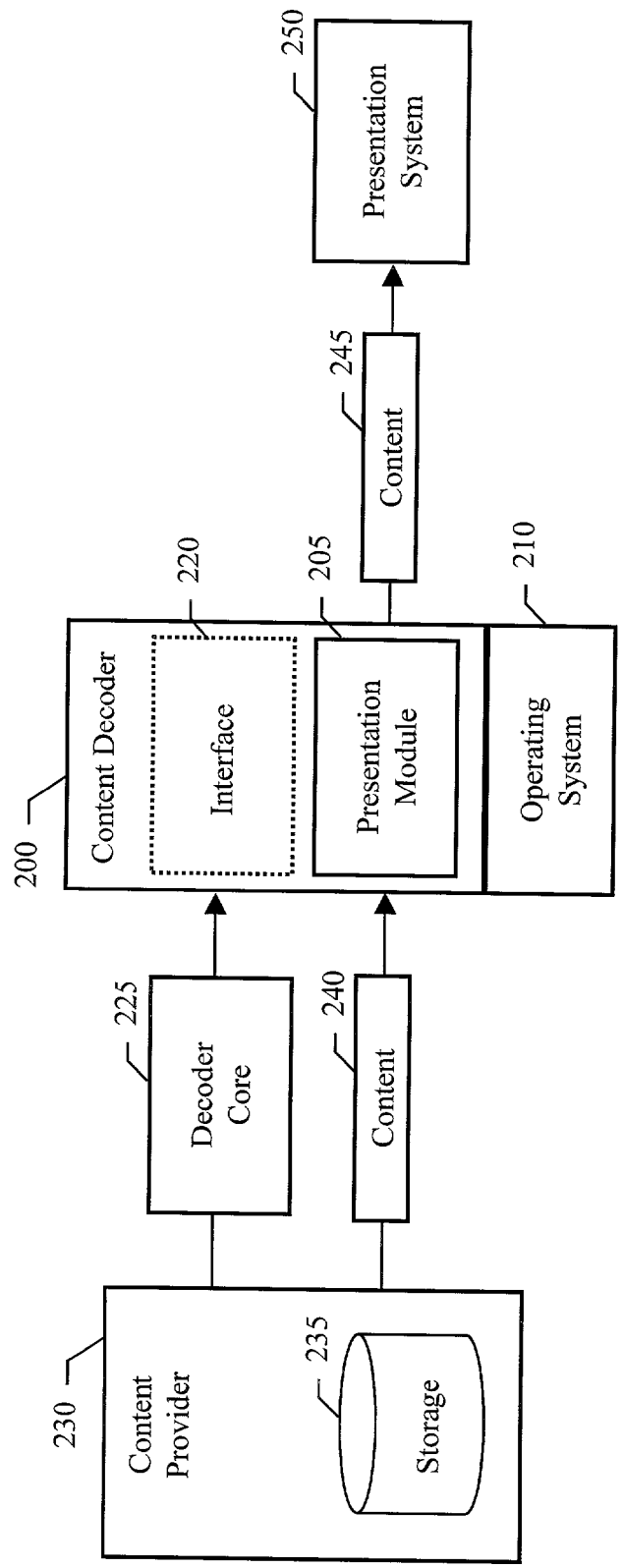
FIG. 2 is a block diagram illustrating an example encrypted digital content delivery and decoding system.

FIG. 2 is a block diagram illustrating an example encrypted digital content delivery and decoding system. A content decoder 200, a content provider 230 and a presentation system 250 correspond respectively to the content decoder 100, content provider 110 and presentation system 130 from FIG. 1. The content decoder 200 includes an interface 220 that defines how a received decoder core 225 is to be integrated with the content decoder 200.

The dashed lines of the interface 220 indicate that the content decoder 200 receives a mutable software module. The content decoder 200 also may include a presentation module 205 to present received digital content. The content decoder 200 may be implemented as a software program running on an operating system 210 on a computer or other machine.

The interface 220 is a predefined interface that provides the hooks (e.g., procedure calls) with which the content decoder 200 runs the decoder core 225. In one implementation, the decoder core 225 is a software plug-in for the content decoder 200. Although the interface 220 is predefined, it may include dynamic features that allow it to change. For example, the decoder core 225 may include data that modifies features of the interface 220, such as by using Extensible Markup Language (XML) data, which the content decoder 200 can read and interpret in accordance with a defined decoder core data interface.

The decoder core 225 may be received from the content provider 230 or from a third party. Digital content 240 may be stored either in encrypted or unencrypted form on a storage 235 at the content provider 230. Digital content 240 that has been encrypted specifically for the decoder core 225 may be received from the content provider 230, decrypted using the decoder core 225 and delivered (with possible re-encryption) as content 245 to the presentation system 250.

By providing a content decoder in which the decoder core may be received at the same time as the content, additional layers of protection may be added to the delivered content. For example, the decoder core may be changed periodically, thereby minimizing potential loss of control over content due to reverse engineering of a particular decryption scheme.

Each piece of digital content may have its own corresponding unique decoder core. For example, each music track downloaded over the Internet may have its own associated decoder core transmitted with the track, either as a package or as two separate transmissions. As another example, each optical storage disc (e.g., a modified DVD) sold at a retail store may have its own decoder core for the content stored on the optical disc. The decoder core 225 may also be bound with the content 240 in a single file format.

The decoder core 225 may be tightly coupled to the digital content 240. For example, the decoder core 225 may include unique keys, timing information and/or be obfuscated with respect to and tied to the digital content 240. Obfuscation of the decoder core 225 may depend on hashing of portions of the digital content 240.

The tight coupling of the decoder core 225 to the digital content 240 may be implemented by regenerating the decoder core 225 for each piece of digital content 240. The decoder core 225 may be scripting language or compiled code. Thus, for example, when the decoder core 225 is compiled code, the decoder core 225 may be recompiled for each piece of digital content 240, and the compiler that generates the core may change how the decoder core 225 is obfuscated and tied to the digital content 240 each time the core is compiled.

During obfuscation of the decoder core 225, appropriate randomness should be used in deciding how and where data is obfuscated. For example, a server that generates the keys and the obfuscated code (either at the content provider 230 or a third party) should have a cryptographically secure random number source, such as a chip certified by the National Security Administration (NSA). Even if the content decoder 200 is reverse engineered, only one decoder core, and thus possibly only a single download session, may be compromised.

In a pay-per-view implementation, the decoder core 225 may be time-stamped for the live time of the media session. For example, an accurate time from a trusted server may be obtained using a signed time check. Signed time checks may be used both to time-stamp the decoder core 225 and to identify the current time for decoding at the content decoder 200.

The decoder core 225 and one or more associated session keys may be encrypted and digitally signed to allow only authorized recipients to obtain the session keys and the decoder core 225. Moreover, the session keys may themselves be delivered with and obfuscated within the decoder core 225 to provide additional security.

The decryption scheme(s) used with the decoder core 225 and the content decoder 200 may include traditional approaches to encryption/decryption and digital rights management. For example, the digital content 240 may have various playback policies associated with it. The content decoder 200 may enforce such policies, thereby controlling which devices may play a particular digital product or digital stream.

For example, the digital content may be initially received in a home by a home computer, even though the digital content is destined for a different device in the home and an associated playback policy prevents display of the digital content on the home computer. In this example, the home computer may receive a decoder core and digital media over the Internet, decrypt the digital media using the decoder core, re-encrypt the digital media using an intra-home content protection scheme, and then send the re-encrypted digital media to an authorized display device, where the re-encrypted data is decrypted and displayed. Example intra-home content protection schemes include DTCP (Digital Transmission Content Protection, which is an encryption scheme typically used on Firewire or iLink, and managed by the Digital Transmission Licensing Administrator (DTLA)), and DVI (Digital Video Interactive) encryption.

As another example, a PC may receive and store the decoder core and the digital content, but not be allowed to decrypt the content because the decoder core is specific to a device other than the PC. The PC sends the decoder core and content to a device in the home that decodes and renders the content. The PC acts as a content server, but is unable to decrypt the content (i.e., "decryption at the leaf").

Figure 3:
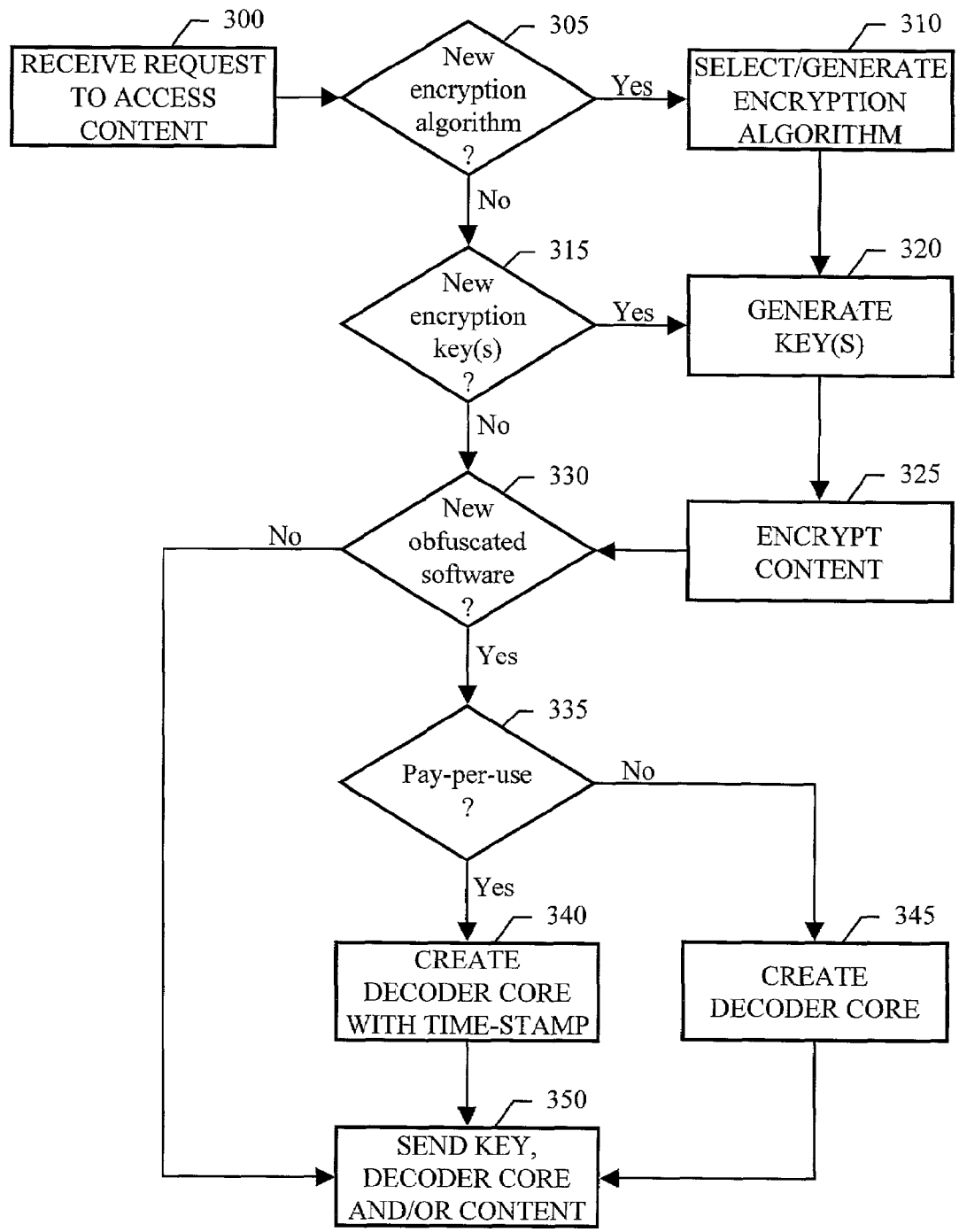
FIG. 3 is a logic flow diagram illustrating an example method of securely delivering digital content.

FIG. 3 is a logic flow diagram illustrating an example method of securely delivering digital content. In this example, only two viewing policies (pay once and pay-per-use using time-stamps) are illustrated. However, many more policies may be implemented with the systems and techniques described in the present application. The content may have various associated paying, authorization (private use content), and/or recorded content policies, additional policies related to time of viewing and/or number of viewings allowed, and combinations of these.

Moreover, these various policies may be implemented in many alternative ways. For example, a pay-per-use policy may be implemented using a single decoder core for multiple sequential uses of content, instead of the one time use decoder core described here. In addition, time-stamping of the decoder core may be used independently of a pay-per-use system, such as for additional security in a content delivery system.

The method of FIG. 3 begins at 300 in which a request to access content is received. The content may already be locally stored by the requester (e.g., from a previous download, or purchase of a storage medium containing the content), or the requester may also be requesting delivery of the content itself at 300.

At 305, a determination is made as to whether a new encryption algorithm is to be used for the requested content. Encryption algorithms may be changed periodically, or new encryption algorithms may be used for each delivery of content. Alternatively, a new encryption algorithm may be used for particular content only after a defined event, such as the end of a broadcast of the content, or a breaking of a currently used encryption algorithm.

If a new encryption algorithm is to be used, the method proceeds to 310, in which a new encryption algorithm is selected or generated before the method proceeds to 320. For example, 310 may involve selecting an encryption algorithm from a set of pre-defined encryption algorithms, or automatic modification of an encryption algorithm by a machine. Alternatively, 310 may involve human design of a new encryption algorithm.

If a new encryption algorithm will not be used, the method proceeds from 305 to 315. At 315, a determination is made as to whether a new key is to be used. For example, if the request is for broadcast content, then a new content key will not be used for each consumer requesting access to the content. If the request is for unicast content, then the content may be encrypted using a different key for each requesting consumer.

If a new key is to be used, then the method proceeds to 320. If not, the method proceeds to 330. At 320, one or more new keys are generated. Generation of the new key(s) at 320 may be an automated process performed by machine. Then at 325, the requested content is encrypted using the designated encryption algorithm and key before the method proceeds to 330.

At 330, a determination is made as to whether a new obfuscation of a decoder core for the designated encryption algorithm is to be used. If not, the method proceeds to 350. If so, the method proceeds to 335. Generally, if a new encryption algorithm has been designated, or if a new key to be delivered within the decoder core has been designated, then a new obfuscation will be needed.

At 335, a check is made to determine if the requested content is pay-per-use content. If so, the method proceeds to 340, and if not, the method proceeds to 345. At 345, the decoder core for the requested content is created. The decoder core is created by producing obfuscated software (i.e., tamper resistant software) that implements the decryptor for a designated encryption algorithm. The obfuscated software may be compiled code, scripting code, interpretable code, etc., and the obfuscated software may be produced using traditional obfuscation techniques such as those discussed above.

When obfuscating the software, including sufficient randomness enhances the degree of obfuscation. For example, in the case of compiled code, the introduced randomness may ensure that the resulting decoder core has about the same number of zeros and ones throughout so that it is not easy to distinguish real code from the obfuscation (i.e. no easily discernable pattern).

The designated decryption key(s) may be included within the decoder core or kept and sent separately. The decoder core may also include a serial number for the transaction or session. Thus, the same key and algorithm may be used for a number of transactions and/or for different content, but each decoder core may still be unique, thereby aiding in tracking a break in security if a decoder core is cracked.

At 340, the decoder core for the requested content is created with a time-stamp. The decoder core is created by producing obfuscated software implementing the decryptor for the designated encryption algorithm, where the obfuscation ties in to a clock. For example, the designated algorithm, the designated key and the current time may all be bundled into a block of obfuscated software to create a pay-per-use system. Each delivery of the decoder core may be the same, except that the clock portion is updated to allow a new viewing of encrypted content already stored locally.

Alternatively, each delivery of the decoder core may include a different key as well as an updated clock portion, in which case a new version of the encrypted content will be downloaded. The decoder core may also include a serial number as described above.

Then at 350, the designated key, decoder core and/or the encrypted content are sent to the requester. Which items are actually sent at 350 depends on the situation created by 300-345. For example, in a pay-per-use system, the decoder core will always be sent at 350, but the encrypted content need only be sent at 350 on the first request. The key may be sent at 350 with each new content access request, such as when the key is included within the decoder core, or the key may only be sent at 350 on the first request.

In contrast, in a pay-once broadcast situation, the encrypted content is never sent at 350. In the broadcast situation, the encrypted content is already readily available over a broadcast channel (e.g., by satellite, cable, Internet, etc.), and only the decoder core and key are sent at 350. Other variations in the order and mechanisms of delivery are also contemplated, including all applications of the method of FIG. 3 with existing content encryption and delivery systems.

Figure 4:
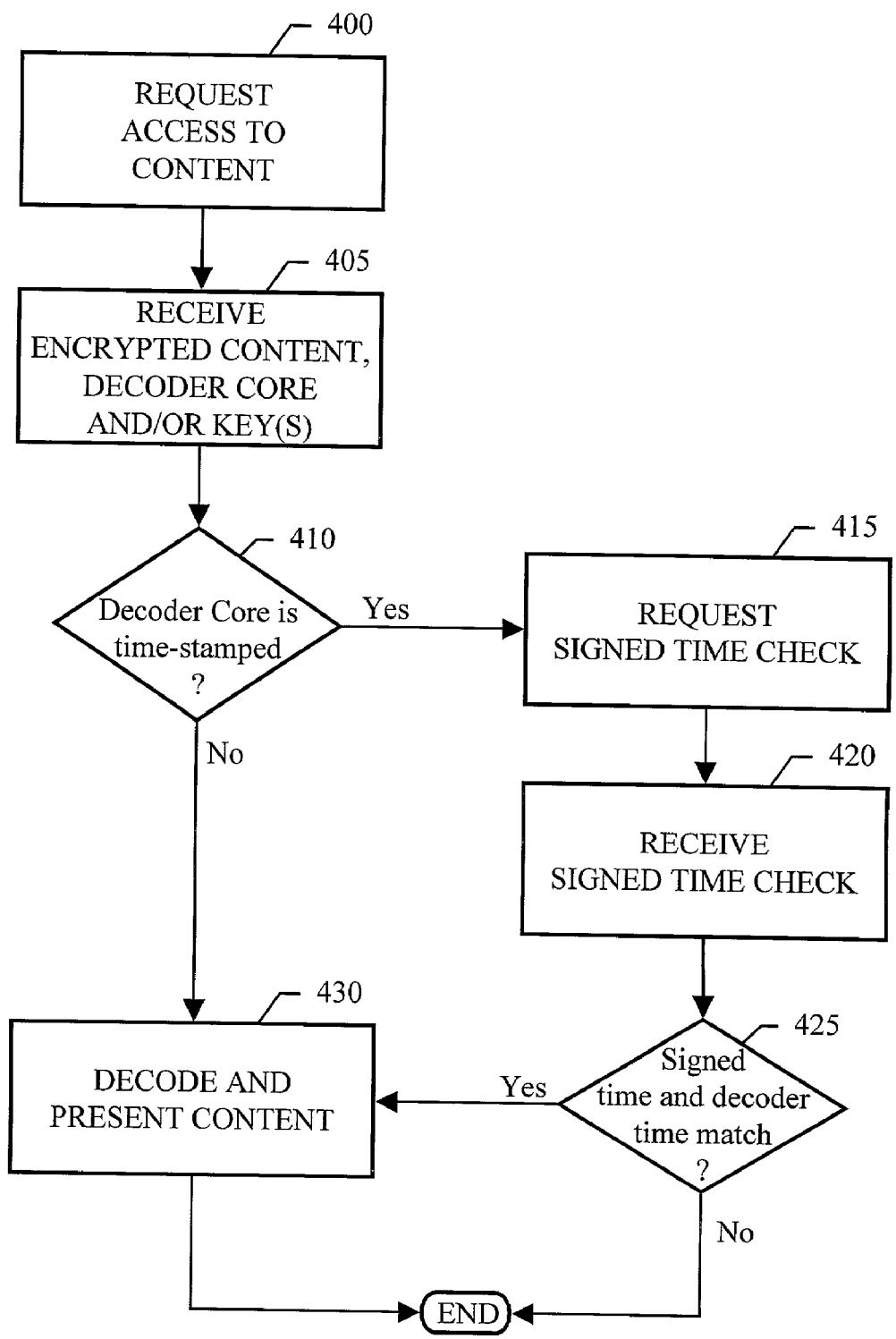
FIG. 4 is a logic flow diagram of an example decryption control process in a digital content decoder.

FIG. 4 is a logic flow diagram of an example decryption control process in a digital content decoder. The digital content decoder may be implemented in software, hardware, or a combination of both. The digital content decoder may be purchased from a retail store in physical form (e.g., as a device and/or as instructions on a machine-readable medium), downloaded over a network, etc.

The decryption control process begins at 400, in which a request to access content is sent to a content provider. As discussed above, the content may have already been received, may have yet to be received or may be currently being received. For example, the request at 400 may be a request to purchase content that has yet to be downloaded, a request to purchase another viewing of content downloaded previously, or a request to view content currently being broadcast. Thus at 405, encrypted content, a decoder core and/or one or more decryption keys are received, depending on the sales mechanism, the encryption scheme and a current state due to prior activities.

Then at 410, the decoder core is checked to determine if it is time-stamped. If not, control passes to 430. If so, control passes to 415, in which a request for a signed time check is sent to a trusted time server. Then at 420, the signed time check is received.

At 425, the time from the received signed time check is compared with the time from the time-stamped decoder core. If the two times match within a predetermined time difference (e.g., six seconds), control passes to 430. Otherwise, the process ends. This time-stamp check may be used to implement a pay-per-use system and/or to discourage hackers from spoofing a content delivery system in an attempt to reverse engineer a decoder core.

At 430, the content decoder decrypts the encrypted content using the decoder core and presents the content. The presentation of the content at 430 may include re-encryption as discussed above. Following the presentation of the content, the process ends.

The process of FIG. 4 may be initiated in a digital content decoder in a number of manners. For example, this process may be initiated by a user selecting a link on a Web page or selecting downloaded encrypted content using an operating system interface (e.g., by double-clicking a file). Alternatively, the process of FIG. 4 may be initiated automatically as part of a larger process, such as when a software program automatically retrieves a plug-in for itself using the techniques described here.

Figure 5:
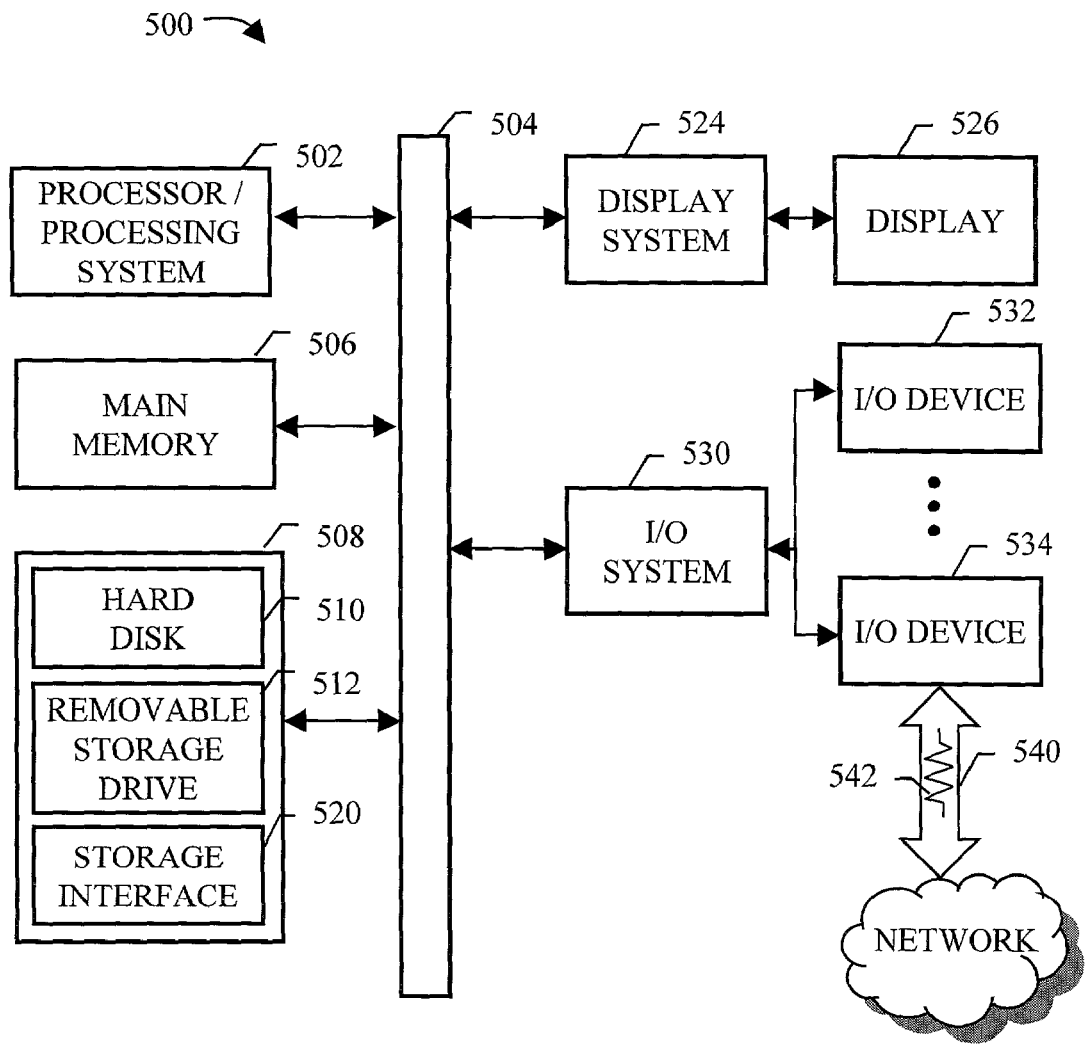
FIG. 5 is a block diagram illustrating an example computing environment.

FIG. 5 is a block diagram illustrating an example computing environment. An example machine 500 includes a processing system 502, which may include a central processing unit such as a microprocessor or microcontroller for executing programs to control tasks in the machine 500, thereby enabling the features and function described above. Moreover, the processing system 502 may include one or more additional processors, which may be discrete processors or may be built into the central processing unit.

The processing system 502 is coupled with a bus 504 or busses, which provide a set of signals for communicating with the processing system 502 and may include a data channel for facilitating information transfer between storage and other peripheral components of the machine 500.

The machine 500 may include a main memory 506 and one or more cache memories, and may also include a secondary memory 508. These memories provide storage of instructions and data for programs executing on the processing system 502, and may be semiconductor based and/or non-semiconductor based memory. The secondary memory 508 may include, for example, a hard disk drive 510, a removable storage drive 512 and/or a storage interface 520.

The machine 500 may also include a display system 524 for connecting to a display device 526. The machine 500 includes an input/output (I/O) system 530 (i.e., one or more controllers or adapters for providing interface functions) for connecting to one or more I/O devices 532-534. The I/O system 530 may provide a communications interface, which allows software and data to be transferred, in the form of signals 542, between machine 500 and external devices, networks or information sources. The signals 542 may be any signals (e.g., electronic, electromagnetic, optical, etc.) capable of being received via a channel 540 (e.g., wire, cable, optical fiber, phone line, infrared (IR) channel, radio frequency (RF) channel, etc.). A communications interface used to receive these signals 542 may be a network interface card designed for a particular type of network, protocol and channel medium, or may be designed to serve multiple networks, protocols and/or channel media.

Machine instructions (also known as programs, software or code) may be stored in the machine 500 or delivered to the machine 500 over a communications interface. As used herein, the term "machine-readable medium" refers to any media used to provide information indicative of one or more operational instructions for the machine 500. Such information includes machine instructions provided to the processing system 502 for execution, and such media include memory devices/units.

Other systems, architectures, and modifications and/or reconfigurations of machine 500 of FIG. 5 are also possible. The various implementations described above have been presented by way of example only, and not limitation. Thus, other embodiments may be within the scope of the following claims.

What is claimed is:

1. A method comprising:
transmitting a decoder core to be used with a predefined content decoder, the decoder core comprising instructions for causing the predefined content decoder to decrypt an encrypted version of digital content;
wherein the predefined content decoder is logically divided into the decoder core, which comprises computer program code that implements a decryption scheme, and remaining portions comprising an interface between the decoder core and one or more content presentation elements, thereby making the predefined content decoder independent of the decryption scheme.

2. The method of claim 1, further comprising receiving a request to access digital content, wherein the transmitting comprises transmitting in response to the request.

3. The method of claim 2, further comprising generating the decoder core in response to the request.

4. The method of claim 3, wherein the decoder core further comprises information corresponding to the request.

5. The method of claim 4, wherein the information comprises a serial number for a session.

6. The method of claim 4, wherein the information comprises timing information.

7. The method of claim 1, wherein the decoder core further comprises a decryption key.

8. The method of claim 1, wherein the decoder core further comprises obfuscated software.

9. The method of claim 8, wherein the obfuscated software comprises content-specific obfuscated software.

10. The method of claim 9, wherein the content-specific obfuscated software corresponds to a content-specific encryption algorithm, the method further comprising:

encrypting the requested digital content using the content-specific encryption algorithm; and
delivering the encrypted digital content.

11. The method of claim 9, wherein the content-specific obfuscated software includes hashed portions of the digital content.

12. The method of claim 1, wherein the predefined content decoder comprises a previously delivered media player.

13. The method of claim 12, wherein the previously delivered media player comprises a satellite transmission receiving device, and wherein the transmitting a decoder core comprises transmitting the decoder core along with the encrypted version of the digital content from a satellite.

14. A method comprising:
receiving a decoder core comprising instructions for decrypting encrypted digital content; and
using the decoder core with a previously acquired content decoder to access the encrypted digital content;
wherein the content decoder is logically divided into the decoder core, which implements a decryption scheme, and remaining portions comprising an interface between the decoder core and one or more content presentation elements, thereby making the content decoder independent of the decryption scheme.

15. The method of claim 14, wherein receiving a decoder core comprises receiving the encrypted digital content and the decoder core together.

16. The method of claim 15, wherein receiving the encrypted digital content and the decoder core together comprises receiving the encrypted digital content and the decoder core over a unidirectional network.

17. The method of claim 14, further comprising receiving the encrypted digital content separate from the decoder core.

18. The method of claim 17, wherein receiving the encrypted digital content comprises receiving the encrypted digital content on an optical disc, and the previously acquired content decoder comprises an optical disc playing device.

19. The method of claim 14, further comprising re-encrypting the digital content using an intra-home content protection scheme.

20. The method of claim 14, wherein receiving a decoder core comprises receiving the decoder core over a network in response to a request for access to the digital content, and wherein the decoder core further comprises information corresponding to the request.

21. The method of claim 20, wherein the information comprises a serial number and timing information, the method further comprising:
requesting a signed time check from a server;
comparing the signed time check with the timing information; and
preventing access to the encrypted digital content if the signed time check does not match the timing information within a predetermined time difference.

22. The method of claim 14, wherein the decoder core further comprises obfuscated software.

23. The method of claim 22, wherein the obfuscated software comprises software that has been obfuscated with respect to the digital content.

24. A machine-readable medium embodying information indicative of instructions for causing one or more machines to perform operations comprising:
defining an interface between a presentation portion and a decryption portion of a digital content player;
identifying a decoder core that uses the interface to effect the decryption portion of the digital content player; and using the decoder core with the digital content player to access encrypted digital content;

wherein the decoder core implements a decryption scheme, and the presentation portion of the digital content player is independent of the decryption scheme.

25. The machine-readable medium of claim 24, wherein defining an interface comprises establishing a public interface for a procedure in a class.

26. The machine-readable medium of claim 24, wherein the interface comprise a dynamic interface in which a portion of the interface is definable by the identified decoder core.

27. A machine-readable medium embodying a content decoder comprising:

a module defining an interface between the content decoder and a mutable decoder core comprising instructions for causing the content decoder to decrypt encrypted media;

wherein the content decoder is logically divided into the mutable decoder core, which implements a decryption scheme, and remaining portions comprising the module defining the interface for use with content presentation, thereby making the content decoder independent of the decryption scheme.

28. The machine-readable medium embodying a content decoder of claim 27, wherein the interface comprises input and output format information for a decryption procedure to be defined by the mutable decoder core.

29. A system for facilitating secure delivery of digital content, the system comprising:

one or more processors operationally coupled with means for transmitting in response to a request, software plug-in means for decrypting digital content and means for receiving the software plug-in means and for presenting the digital content using the software plug-in means;

wherein the software plug-in means implements a decryption scheme, and the means for presenting the digital content is independent of the decryption scheme.

30. The system of claim 29, further comprising means for generating the software plug-in means in response to the request.

\* \* \* \* \*